US007570293B2

(12) United States Patent
Nakamura

(10) Patent No.: US 7,570,293 B2
(45) Date of Patent: Aug. 4, 2009

(54) IMAGE SENSOR WITH ON-CHIP SEMI-COLUMN-PARALLEL PIPELINE ADCS

(75) Inventor: Junichi Nakamura, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 917 days.

(21) Appl. No.: 10/957,724

(22) Filed: Oct. 5, 2004

(65) Prior Publication Data

US 2006/0050162 A1 Mar. 9, 2006

(30) Foreign Application Priority Data

Sep. 9, 2004 (JP) ............................. 2004-262326

(51) Int. Cl.
  *H40N 3/14* (2006.01)
  *H40N 5/235* (2006.01)
  *H03M 1/00* (2006.01)
(52) U.S. Cl. ..................... 348/308; 348/222.1; 341/126
(58) Field of Classification Search ................. 348/307, 348/308, 311, 221.1; 341/126, 159
See application file for complete search history.

(56) References Cited

U.S. PATENT DOCUMENTS

| 6,115,066 A * | 9/2000 | Gowda et al. ............... 348/308 |
| 6,433,822 B1 * | 8/2002 | Clark et al. ................ 348/241 |
| 6,573,936 B2 * | 6/2003 | Morris et al. ............... 348/294 |
| 6,583,817 B1 * | 6/2003 | Lee ........................... 348/241 |
| 6,685,396 B1 * | 2/2004 | Bergeron ..................... 405/224 |
| 7,002,628 B1 * | 2/2006 | Panicacci .................... 348/307 |
| 7,119,317 B2 * | 10/2006 | Ando et al. ............... 250/208.1 |
| 2004/0135910 A1 * | 7/2004 | Nam .......................... 348/308 |

FOREIGN PATENT DOCUMENTS

| JP | 2001-111425 | 4/2001 |
| JP | 2001-189892 | 7/2001 |
| JP | 2002-27331 | 1/2002 |
| JP | 2002064750 | 2/2002 |
| JP | 2002314420 | 10/2002 |
| JP | 2003087664 | 3/2003 |
| JP | 2003234967 | 8/2003 |

OTHER PUBLICATIONS

B. Razavi, "Principles of Data Conversion System Design," IEEE Press, 1995, Chapter 6, pp. 140-143.

* cited by examiner

*Primary Examiner*—Nhan T Tran
*Assistant Examiner*—Trung Diep
(74) *Attorney, Agent, or Firm*—Dickstein Shapiro LLP

(57) ABSTRACT

An imaging device with a semi-column-parallel pipeline analog-to-digital converter architecture. The semi-column-parallel pipeline architecture allows multiple column output lines to share an analog-to-digital converter. Analog-to-digital conversions are performed in a pipelined manner to reduce the conversion time, which results in shorter row times and increased frames rate and data throughput. The architecture also enhances the pitch of the analog-to-digital converters, which allows high performance, high resolution analog-to-digital converters to be used. As such, semi-column-parallel pipeline architecture overcomes the shortcomings of the typical serial and column-parallel architectures.

15 Claims, 11 Drawing Sheets

IMAGE SENSOR WITH ON-CHIP SEMI-COLUMN-PARALLEL PIPELINE ADCS

FIELD OF THE INVENTION

The invention relates generally to imaging devices and more particularly to an image sensor with on-chip semi-column-parallel pipeline analog-to-digital converters.

BACKGROUND

A CMOS imager circuit includes a focal plane array of pixel cells, each one of the cells including a photosensor, for example, a photogate, photoconductor or a photodiode overlying a substrate for accumulating photo-generated charge in the underlying portion of the substrate. Each pixel cell has a charge storage region, formed on or in the substrate, which is connected to the gate of an output transistor that is part of a readout circuit. The charge storage region may be constructed as a floating diffusion region. In some imager circuits, each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state before the transfer of charge to it; (4) transfer of charge to the storage region accompanied by charge amplification; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

A typical four transistor (4T) CMOS imager pixel 10 is shown in FIG. 1. The pixel 10 includes a photosensor 12 (e.g., photodiode, photogate, etc.), transfer transistor 14, floating diffusion region FD, reset transistor 16, source follower transistor 18 and row select transistor 20. The photosensor 12 is connected to the floating diffusion region FD by the transfer transistor 14 when the transfer transistor 14 is activated by a transfer gate control signal TX.

The reset transistor 16 is connected between the floating diffusion region FD and an array pixel supply voltage Vaa_pix. A reset control signal RST is used to activate the reset transistor 16, which resets the floating diffusion region FD to the array pixel supply voltage Vaa_pix level as is known in the art.

The source follower transistor 18 has its gate connected to the floating diffusion region FD and is connected between the array pixel supply voltage Vaa_pix and the row select transistor 20. The source follower transistor 18 converts the charge stored at the floating diffusion region FD into an electrical output voltage signal Vout. The row select transistor 20 is controllable by a row select signal SEL for selectively connecting the source follower transistor 18 and its output voltage signal Vout to a column line 22 of a pixel array.

FIG. 2 illustrates a typical imaging device 50 comprising a pixel array 56 containing multiple pixels 10 organized into a plurality of rows and columns. The device 50 also contains a row decoder 52, row driver 54, row operations and ADC (analog-to-digital converter) controller 58, a plurality of analog-to-digital converters $60_1, 60_2, \ldots, 60_n$ (collectively analog-to-digital converters 60), a static random access memory (SRAM)/read controller 66, a plurality of sample and hold (S/H) and amplifier circuits $72_1, 72_2, \ldots, 72_n$ (collectively S/H circuits 72), two memory banks 62, 64, sense amplifier circuitry 68 and a column decoder 70.

The S/H circuits 72 are connected to the column lines 22 of the array 56. The analog-to-digital converters 60 are connected to the S/H circuits 72 by what is commonly known as a column-parallel architecture. That is, in the illustrated imaging device 50, each column or column line 22 of the array 56 is connected to a respective analog-to-digital converter 60, which operate in parallel to convert analog signals from the array 56 (via the S/H circuitry 72) to digital signals.

The imaging device 50 is operated by the row operations and ADC controller 58, which controls the row driver 54 and the analog-to-digital converters 60. The row operations and ADC controller 58 also issues a sample control signal SAMPLE to the first memory bank 62, which is illustratively an SRAM device. The second controller, i.e., the SRAM/read controller 66 also controls the operation of the imaging device 50 by controlling the second memory bank 64, also an SRAM device (via a shift control signal SHIFT), and the column decoder 70.

In operation, row lines are selectively activated by the row driver 54 in response to the row decoder 52. The S/H circuits 72 input a pixel reset signal Vrst and a pixel image signal Vsig for selected pixels. A differential signal (Vrst-Vsig) is produced, by a differential amplifier within the S/H circuits 72, for each pixel and is digitized by the analog-to-digital converters 60. The digitizing of the data from each column is performed in parallel. The digitized signals are stored in the first memory bank 62 (when the sample control signal SAMPLE is issued) and subsequently shifted into the second memory bank 64 (when the sample control signal SAMPLE is issued). The sense amplifier circuitry 68 senses the stored digital data from the second memory bank 64 and outputs the digital information so that it may be processed by e.g., an image processor (not shown).

As described above, the analog-to-digital converters 60 of the illustrated imaging device 50 are connected in accordance with a column-parallel architecture. Some imaging devices, by contrast, have analog-to-digital converters connected using a serial architecture, whereby one analog-to-digital converter is used to convert the analog imager signals from all columns. The conversions are performed one column at a time in a serial manner.

The column-parallel architecture has several advantages over the serial architecture. Most notably, the column-parallel architecture consumes less power than the serial architecture while also offering comparable or lower (i.e., better) noise performance. This can be seen from the following comparisons.

Presume that the imaging device has an array comprising $N_H \times N_V$ pixels and operates at FR frames/s (i.e., it has a Frame time $T_{frame}=1/FR$). In the following equations, unless otherwise indicated, the subscript "S" is used for variables associated with the serial architecture and the subscript "CP" is used for variables associated with the column-parallel architecture. For simplicity purposes, the power consumption of a serial analog-to-digital converter is expressed as:

$$P_S = V_{AA} \cdot I_{AA\_S}, \quad (1)$$

where $V_{AA}$ is a supply voltage and $I_{AA}$ is an average current flowing from $V_{AA}$. The conversion rate can then be approximated as follows:

$$f_{CONV\_S} = \frac{N_H \cdot N_V}{T_{frame}} [H_Z], \quad (2)$$

where, $T_{frame}$ is the frame time.

The power consumption and conversion rate of a column-parallel analog-to-digital converter can be respectively expressed as:

$$P_{CP} = N_H \cdot V_{AA} \cdot I_{AA\_CP}, \text{ and} \quad (3)$$

$$f_{CONV\_CP} = \frac{1}{1H} = \frac{N_V}{T_{frame}} [Hz]. \quad (4)$$

From equations (2) and (4), the ratio of the required frequency bandwidth can be expressed as:

$$\frac{\Delta f_{CP}}{\Delta f_S} = \frac{1}{N_H}. \quad (5)$$

Assuming that an identical analog-to-digital converter is used for the column-parallel architecture, a power consumption ratio is derived as follows. The bandwidth of an analog circuit in the ADC is given by $$\Delta f \propto \frac{g_m}{C}, \quad (6)$$

where $g_m$ is the "effective" transconductance of an amplifier and C is its "effective" load capacitance. Since the transconductance $g_m$ of a MOS transistor is proportional to $\sqrt{I_{AA}}$, i.e., $g_m \propto \sqrt{I_{AA}}$, the power consumption ratio may be represented by:

$$\frac{P_{CP}}{P_S} = \frac{N_H \cdot I_{AA\_CP}}{I_{AA\_S}} = N_H \cdot \left(\frac{g_{m\_CP}}{g_{m\_S}}\right)^2. \quad (7)$$

Plugging in equations (5) and (6) above, equation (7) can be represented as:

$$\frac{P_{CP}}{P_S} = N_H \cdot \left(\frac{C_{CP}}{C_S}\right)^2 \cdot \left(\frac{\Delta f_{CP}}{\Delta f_S}\right)^2 = \frac{1}{N_H} \cdot \left(\frac{C_{CP}}{C_S}\right)^2 \quad (8)$$

Thus, the power consumption in the column-parallel architecture becomes smaller than that of the serial architecture.

Amplifier thermal noise $n_{amp}$ is proportional to $\Delta f/g_m$ as shown by the following equation:

$$n_{amp}^2 \propto \frac{\Delta f}{g_m}. \quad (9)$$

If the frequency bandwidth $\Delta f$ is given by equation (6), then equation (9) becomes:

$$n_{amp}^2 \propto \frac{1}{C}. \quad (10)$$

The kTC noise associated with a sample-and-hold operation has the same relationship as that shown by equation (10). Thus, the temporal noise in the column-parallel architecture is expected to be the same as the noise in the serial architecture, if the capacitance value is the same in both architectures. Although it is likely that $C_{CP} < C_S$, noise tends to mix in the serial approach since the distance between the column circuits and a serial ADC is much longer in the serial architecture.

Thus, the column-parallel architecture provides a low power, low noise digital-output CMOS imaging device (as compared to the serial architecture).

As can be seen from FIG. 2, in the conventional column-parallel analog-to-digital architecture, one analog-to-digital converter 60 is devoted/connected to one column of the pixel array 56. Sometimes, the analog-to-digital converters 60 are devoted/connected to more than one column of the pixel array 56. Although the column-parallel architecture offers operational benefits over the serial architecture, it does have some shortcomings. For example, the layout of an analog-to-digital converter with respect to column pitch, or a few times the column pitch, of the imaging device becomes increasingly difficult to implement as pixel sizes shrink to less than 3 μm. Although the column-parallel architecture may be used in these devices, the architecture requires a long and narrow layout for each analog-to-digital converter; this will use an extremely large area, which is expensive and undesirable.

Another potential shortcoming concerns the conversion speed of the conventional single slope (SS) analog-to-digital converter. That is, the conversion speed of the single slope analog-to-digital converter is not fast enough to for image sensors with high pixel count (e.g., greater than 2M pixels), analog-to-digital conversion resolution (e.g., greater than 12 bits) and/or video frame rate (e.g., greater than 60 frames per second (fps)).

As indicated earlier, it is possible to connect more than one column to an analog-to-digital converter in the column-parallel architecture. In situations where the column-parallel architecture is configured such that multiple columns share a successive approximation (SA) analog-to-digital converter or a single slope analog-to-digital converter, the analog-to-digital conversion is done in a somewhat sequential manner, as shown in FIG. 3. FIG. 3 illustrates the situation where four columns share the same analog-to-digital converter. During a first time interval 80, e.g., the horizontal blanking period (H-BL) of the imaging device 50, pixel outputs from the four columns of the row being read out ROW_i are sampled into the appropriate column S/H circuitry 72. Then, in the next time interval 82, e.g., the horizontal scanning period (H-SCAN) of the device 50, the analog-to-digital conversion of the ROW_i signals takes place, while the digital data generated in a previous row ROW_i–1 is read out.

FIG. 3 illustrates the situation where four columns of ROW_i are respectively converted during the ADC_0, ADC_1, ADC_2 and ADC_3 conversion periods. As shown in FIG. 3, the conversions ADC_0, ADC_1, ADC_2, ADC_3 are done sequentially. In a third time period 84, four columns from the next row ROW_i+1 are read out. The signals from ROW_i+1 are converted while the converted signals from ROW_i are output during the fourth illustrated time period 86. Thus, even though a column-parallel architecture is used, many of the conversions are still performed in a serial manner, which is undesirable.

Thus, the shortcomings of the current column-parallel analog-to-digital converter architecture makes is difficult to achieve a digital-output image sensor with small pixel size (e.g., less than 3 μm), high pixel count (e.g., greater than 2M-pixels), high ADC resolution (e.g., greater than 12 bits) and high video frame rate (e.g., greater than 60 fps). Accordingly, there is a need and desire for an analog-to-digital converter architecture that is suitable for use with an imaging device, such as a CMOS imaging device, having small pixel size (e.g., less than 3 μm), high pixel count (e.g., greater than 2M-pixels), high ADC resolution (e.g., greater than 12 bits) and high video frame rate (e.g., greater than 60 fps).

SUMMARY

The invention provides an analog-to-digital converter architecture that is suitable for use with an imaging device, such as a CMOS imaging device, having small pixel size (e.g., less than 3 μm), high pixel count (e.g., greater than 2M-pixels), high ADC resolution (e.g., greater than 12 bits) and high video frame rate (e.g., greater than 60 fps).

The above and other features and advantages are achieved in various exemplary embodiments of the invention by providing an imaging device with a semi-column-parallel pipeline analog-to-digital converter architecture. The semi-column-parallel pipeline architecture allows multiple column output lines to share an analog-to-digital converter. Analog-to-digital conversions are performed in a pipelined manner to reduce the conversion time, which results in shorter row times and increased frames rate and data throughput. The architecture also enhances the pitch of the analog-to-digital converters, which allows high performance, high resolution analog-to-digital converters to be used. As such, semi-column-parallel pipeline architecture overcomes the shortcomings of the typical serial and column-parallel architectures.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

Figure 1:
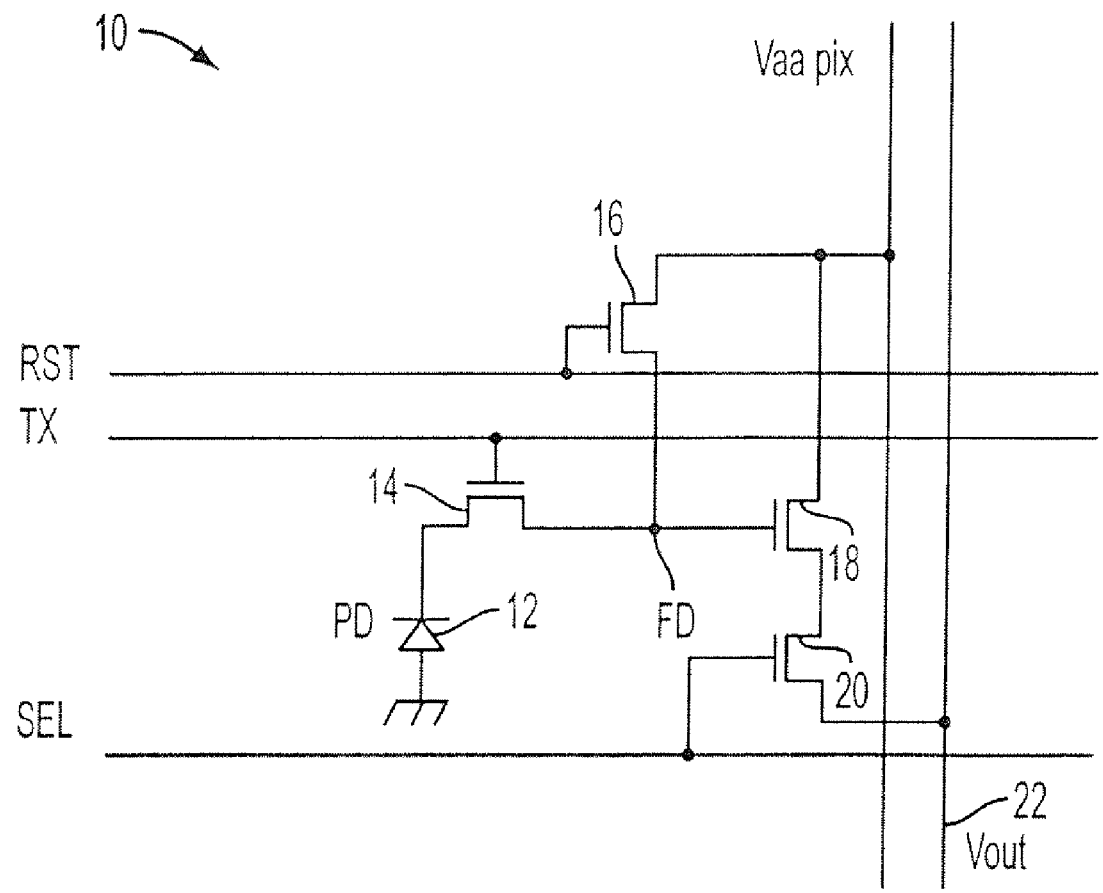
FIG. 1 illustrates a conventional imager pixel circuit.
Figure 2:
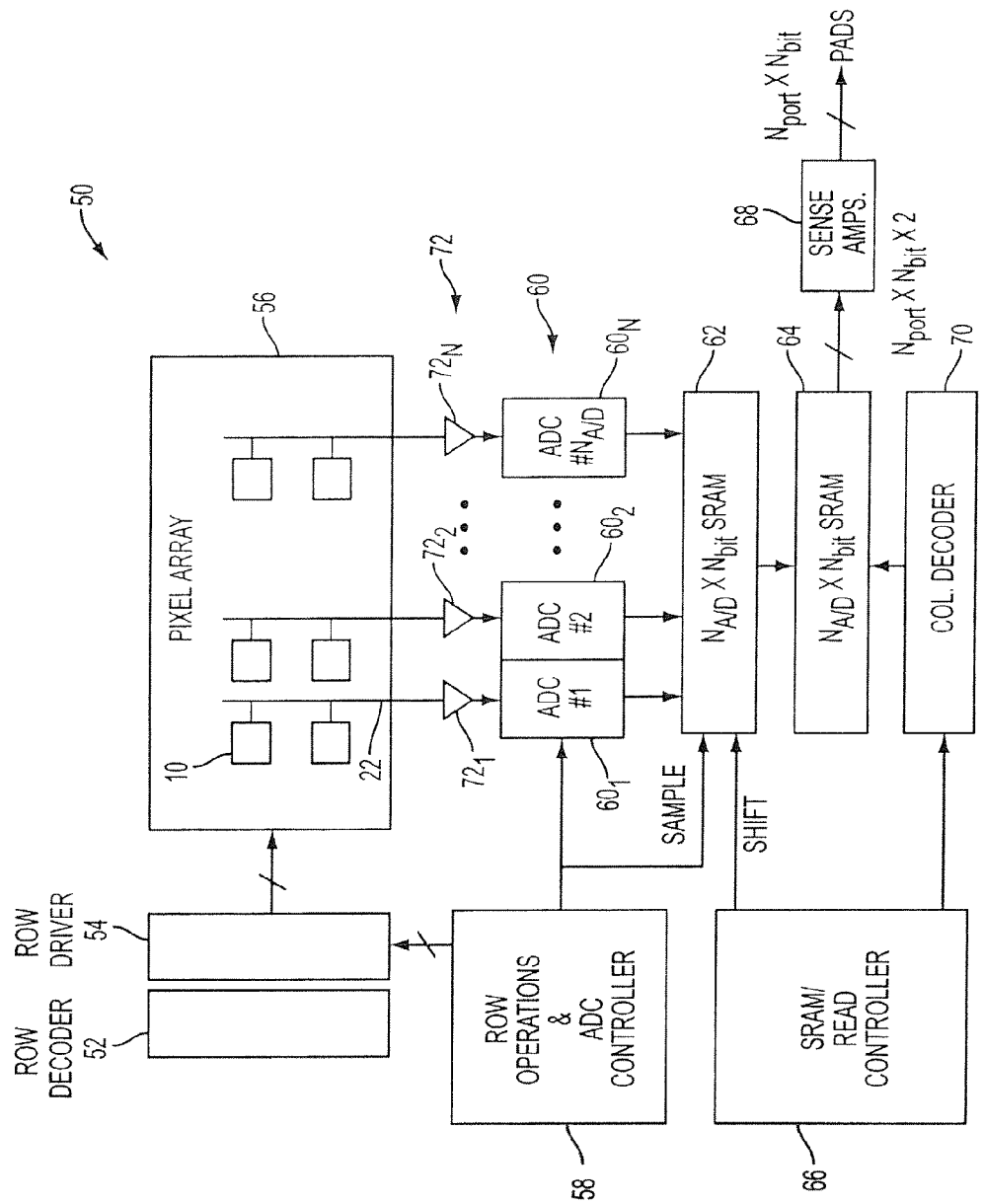
FIG. 2 illustrates a conventional imaging device.
Figure 3:
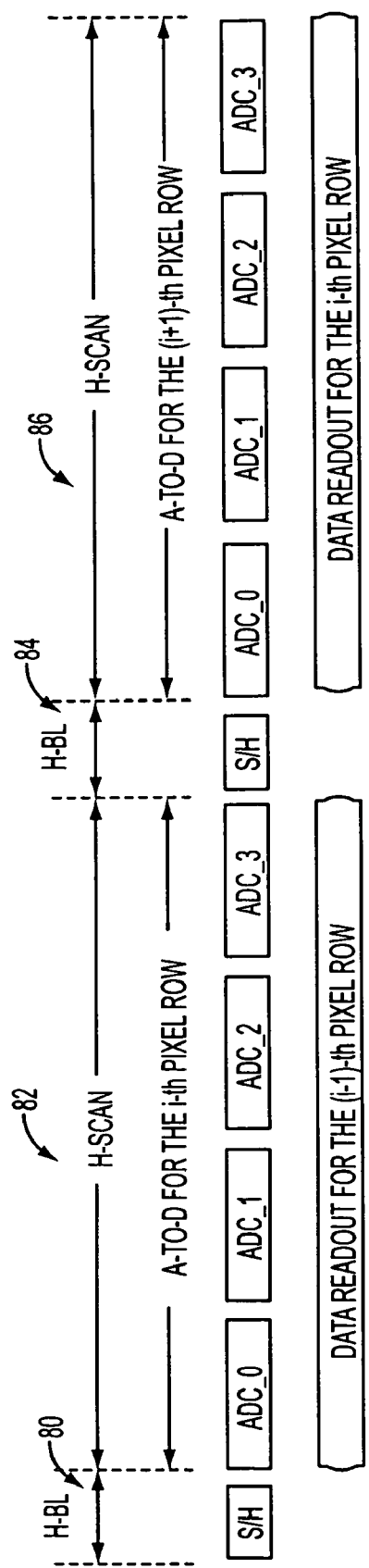
FIG. 3 illustrates a timing diagram for a column-parallel analog-to-digital converter architecture, where four columns share an analog-to-digital converter.
Figure 4:
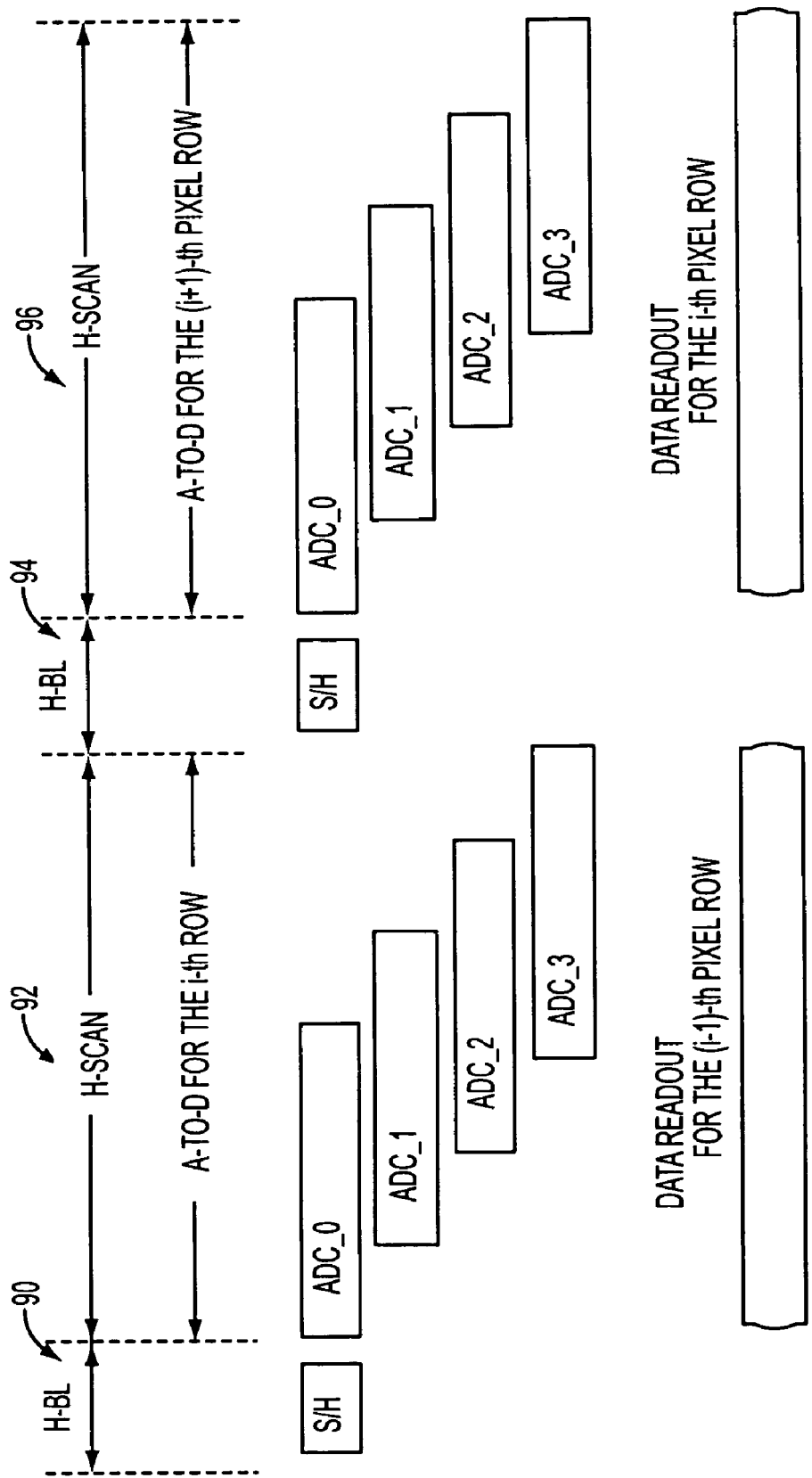
FIG. 4 is an exemplary timing diagram illustrating a first method of operating a semi-column-parallel pipeline analog-to-digital converter constructed in accordance with an exemplary embodiment of the invention.

FIG. 4 is an exemplary timing diagram illustrating a first method of operating a semi-column-parallel pipeline analog-to-digital converter constructed in accordance with an exemplary embodiment of the invention. As is described below in more detail, the invention uses a pipeline analog-to-converter instead of the conventional successive approximation ADC or single slope ADC (described above with respect to FIGS. 2 and 3). As such, each analog-to-digital conversion performed by the invention is pipelined. Moreover, as is described below in more detail with respect to FIGS. 6-9, multiple columns from a pixel array share a single analog-to-digital converter. As such, the invention utilizes a semi-parallel column pipeline analog-to-digital converter architecture.

The first operating method is described using an exemplary architecture whereby each analog-to-digital converter is shared by four columns. Furthermore, for example purposes only, the resolution of each analog-to-digital converter is 5 bits.

During a first time period 90, e.g., the horizontal blanking period (H-BL), pixel outputs from the four columns of the current row ROW_i are sampled into the appropriate column sample-and-hold circuitry. In the next time period 92, e.g., the horizontal scanning period (H-SCAN), analog-to-digital conversions ADC_0, ADC_1, ADC_2, ADC_3 are performed on ROW_i signals while the digital data generated for the previous ROW_i−1 are read out.

As shown in FIG. 4, the conversions ADC_0, ADC_1, ADC_2, ADC_3 are pipelined (unlike the conversions ADC_0, ADC_1, ADC_2 ADC_3 performed during the operation of the column-parallel architecture illustrated in FIG. 3). In a third time period 94, four columns from the next row ROW_i+1 are sampled and held. The signals from ROW_i+1 are converted while the converted signals from ROW_i are output during the fourth illustrated time period 96.

In the first exemplary operating method, the analog-to-digital conversions and the data readout operations (e.g., time periods 92 and 96) do not take place during the sample-and-hold periods (e.g., time periods 90 and 94). This avoids possible noise mixture on the analog signal being sampled and held.

It should be noted that with the semi-column-parallel configuration of the invention, the pitch of an analog-to-digital converter is several times the column pitch, which allows the invention to use of a high-performance, high-resolution pipeline analog-to-digital converter. Moreover, the conversion time $t_{ADC}$ of one analog-to-digital conversion and the total conversion time $t_{ROW}$ are calculated as follows:

$$t_{ADC} = N_{bit} \cdot t_{STAGE}; \text{ and} \quad (11)$$

$$t_{ROW} = t_{ADC} + (N_{col} - 1) \cdot t_{STAGE} + t_{S/H} = (N_{bit} + N_{col} - 1) \cdot t_{STAGE} + t_{S/H} m, \quad (12)$$

where $t_{STAGE}$ is the time required for one stage of the pipeline analog-to-digital conversion, $t_{S/H}$ is the time required for the sample and hold operation, $N_{bit}$ is the number of bits of the analog-to-digital conversion and $N_{col}$ is the number of columns sharing the analog-to-digital converter.

The row time for the conventional column-parallel architecture scheme illustrated in FIG. 3 may be calculated as follows:

$$t_{ROW}' = N_{col}' \cdot t_{ADC}' + t_{S/H}'. \quad (13)$$

If it is assumed that $N_{col} = N_{col}'$, $t_{S/H} = t_{S/H}'$, and $$t_{STAGE} < \frac{N_{col}}{N_{col} + N_{bit} - 1} \cdot t_{ADC}' = \frac{1}{1 + \frac{N_{bit}-1}{N_{col}}} \cdot t_{ADC}'. \quad (14)$$

The first operating method of the present invention results in shorter row times and thus, higher frame rate and data throughput than the conventional column-parallel architecture illustrated in FIG. 3.

Figure 5:
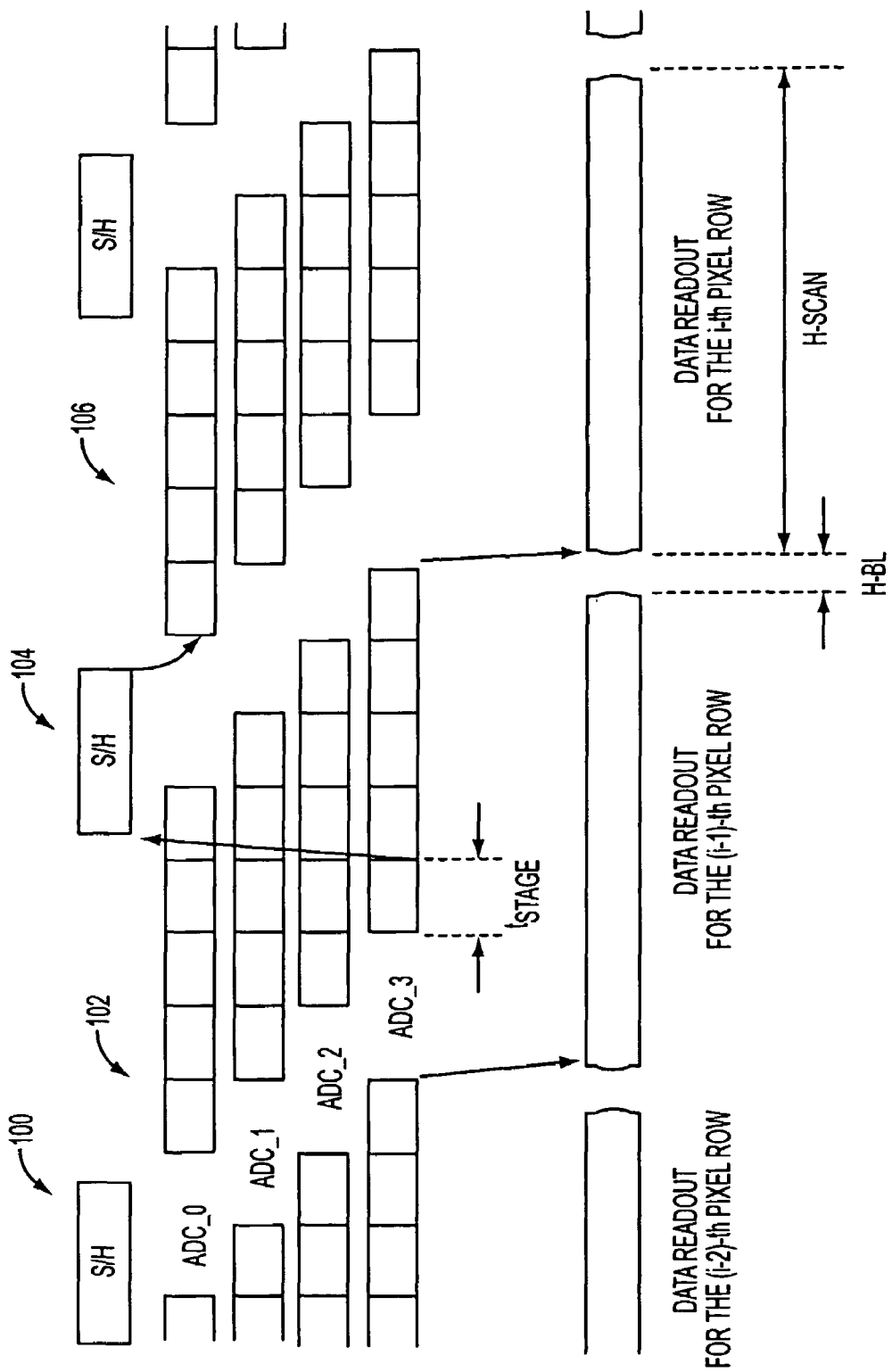
FIG. 5 is an exemplary timing diagram illustrating a second method of operating a semi-column-parallel pipeline analog-to-digital converter constructed in accordance with an exemplary embodiment of the invention.

FIG. 5 is an exemplary timing diagram illustrating a second method of operating a semi-column-parallel pipeline analog-to-digital converter constructed in accordance with an exemplary embodiment of the invention. In the second operating method, the pipelined analog-to-digital conversions and the digital data readout occur during the sample-and-hold operation to further increase the data throughput.

The second operating method is now described using an exemplary architecture whereby each analog-to-digital converter is shared by four columns. Furthermore, for example purposes only, the resolution of each analog-to-digital converter is 5 bits.

During a first S/H time period 100, pixel outputs from the four columns of the current row ROW_i are sampled into the appropriate column sample-and-hold circuitry. This S/H time period 100 also includes the completion of the pipelined analog-to-digital conversion of the signals from the previous row ROW_i−1. The S/H time period 100 also includes the completion of a data readout operation of a prior row ROW_i−2. In the next time period 102, analog-to-digital conversions ADC_0, ADC_1, ADC_2, ADC_3 are begun on the signals from ROW_i while the digital data generated for ROW_i−1 begins to be read out. The conversions ADC_0, ADC_1, ADC_2, ADC_3 are pipelined. In the next S/H time period 104, four columns from the next row ROW_i+1 are read out. In addition, the analog-to-digital conversions ADC_0, ADC_1, ADC_2, ADC_3 for ROW_i are completed, while the readout of ROW_i−1 is completed. The signals from ROW_i+1 begin to be converted while the converted signals from ROW_i begin to be output during the fourth illustrated time period 106 (corresponding to the H-SCAN period).

In the second operating method of the invention, the sample and hold operation can be performed during the conversion of the prior row's data (as shown during S/H time period 104). As such, the row time for the second operating method is represented as:

$$t_{ROW} = N_{col} \cdot t_{STAGE} + t_{S/H}. \quad (15)$$

The data readout rate is chosen so that the data readout period is shorter than the row time.

Comparing equation (15) with equation (13), if $$t_{STAGE} < t_{ADC}' \quad (16)$$

then, the second operating method of the invention results in shorter row time and thus, higher frame rate and data throughput than the operation of the conventional column-parallel analog-to-digital architecture illustrated in FIG. 3.

If we compare equation (15) with the conventional column-parallel ADC scheme using $N_{col}'=1$ in equation (13), and if $$t_{STAGE} < \frac{t_{ADC}'}{N_{col}} \quad (17)$$

then, the second operating method of the invention results in shorter row time and thus, higher frame rate/data throughput, than those of the conventional column-parallel ADC scheme that uses one ADC per column.

Figure 6:
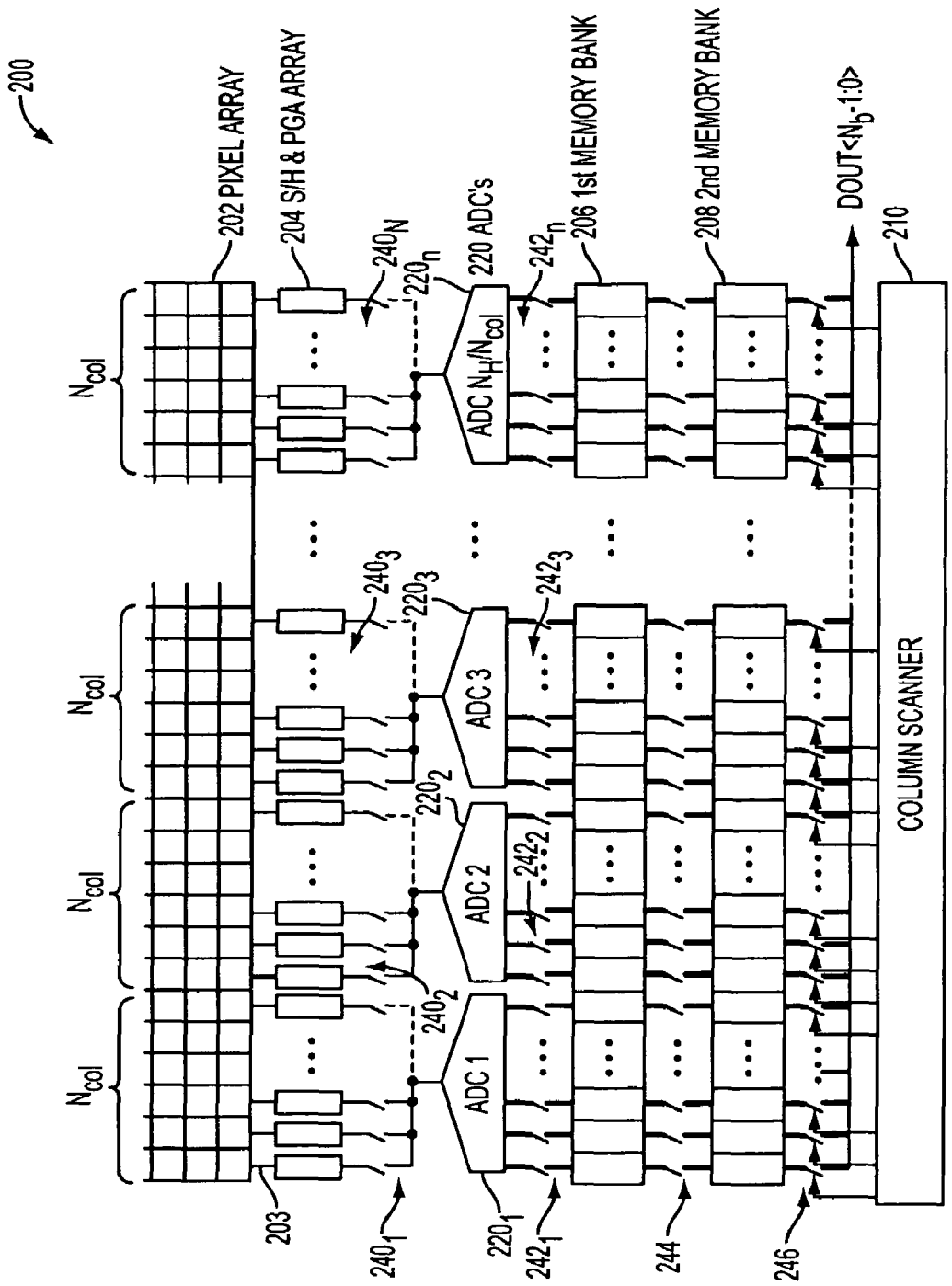
FIG. 6 illustrates an imaging device having a semi-column-parallel pipeline analog-to-digital converter architecture constructed in accordance with an exemplary embodiment of the invention.

FIG. 6 illustrates an imaging device 200 having a semi-column-parallel pipelined analog-to-digital converter architecture constructed in accordance with an exemplary embodiment of the invention. The device 200 may be operated in accordance with the first or second operating method illustrated in FIGS. 4 and 5 (described above). The device 200 includes a pixel array 202 organized into a plurality of rows and columns. Column lines 203 from the array 202 are coupled to respective S/H (sample-and-hold) and PGA (programmable gain amplifier) array circuitry 204. Although a detailed description is omitted here, the suppression of FPN (fixed pattern noise) is usually performed in the S/H and PGA array circuitry 204.

Outputs from a block of S/H and PGA circuits 204, connected to a predetermined number of columns $N_{col}$, are fed to respective pipeline analog-to-digital converters $220_1$, $220_2$, $220_3$, ..., $220_n$ (collectively analog-to-digital converters 220) through respective first switches $240_1$, $240_2$, $240_3$, ..., $240_n$ (collectively first switches 240). The digital outputs of the analog-to-digital converters $220_1$, $220_2$, $220_3$, ..., $220_n$ are sent to a first memory bank 206 through respective second switches $242_1$, $242_2$, $242_3$, ..., $242_n$ (collectively second switches 242). Once the first memory bank 206 is filled, the converted digital data is sent to a second memory bank 208 through a third set of switches 244. The stored digital data DOUT<$N_b$:0> is read out of the second memory bank 208, via a fourth set of switches 246 under the control of a column scanner 210, during the next H-SCAN period (as shown for example in FIG. 4). It should be noted that $N_b$ in FIG. 6 represents the number of bits being output.

Figure 7:
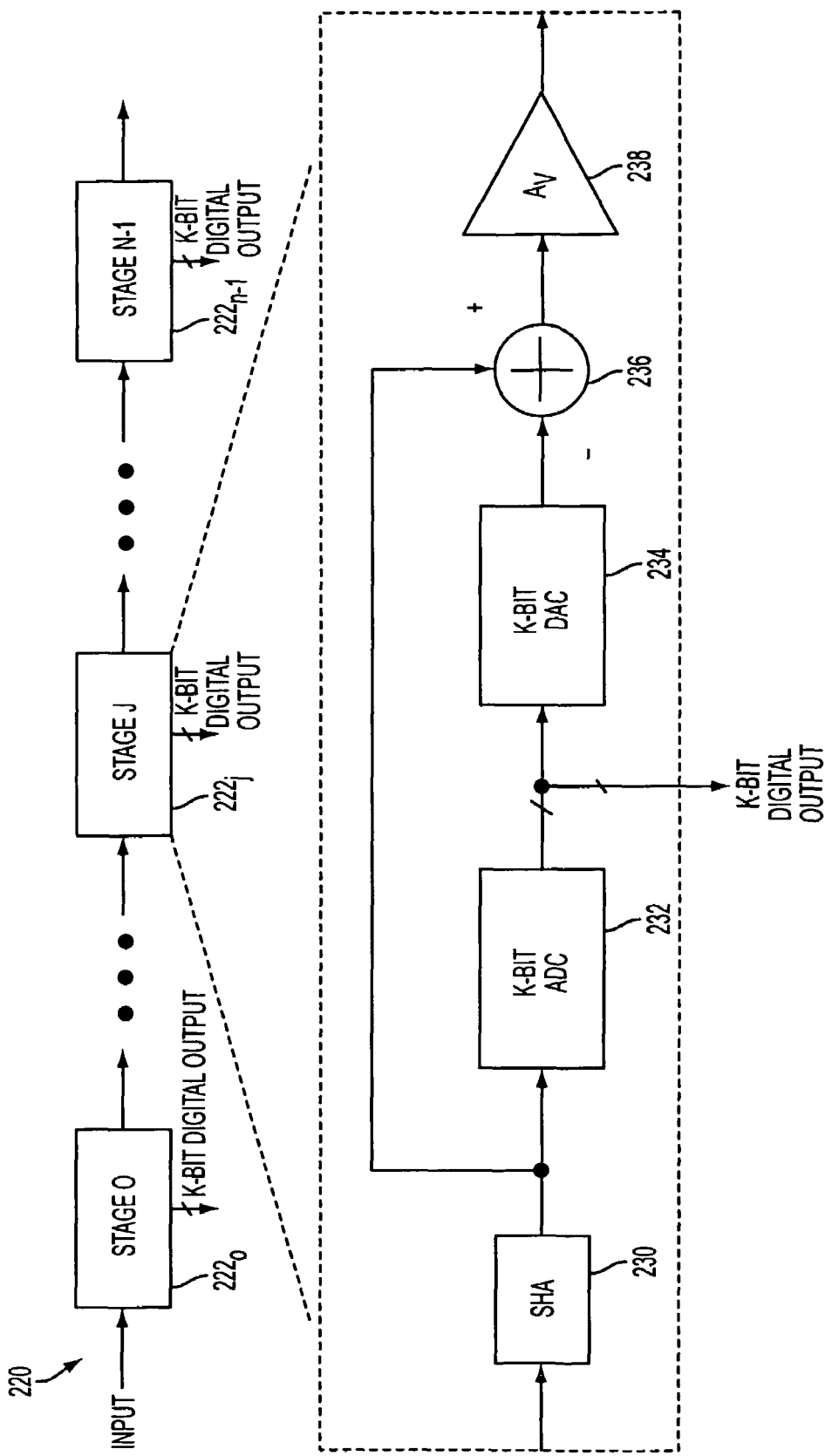
FIG. 7 illustrates a pipeline analog-to-digital converter constructed in accordance with an exemplary embodiment of the invention.

FIG. 7 illustrates a pipeline analog-to-digital converter 220 constructed in accordance with an exemplary embodiment of the invention. The analog-to-digital converter 220 is a pipelined converter such as the one described in B. Razavi, Principles of Data Conversion System Design, IEEE Press, 1995, Chapter 6, pp. 140-143, which is hereby incorporated by reference in its entirety. The converter 220 includes N stages $222_0$, ..., $222_j$, ... $222_{n-1}$. Each stage includes a sample and hold amplifier (SHA) 230, a k-bit analog-to-digital converter 232, a k-bit digital-to-analog converter (DAC), a subtractor 236, and an amplifier 238. It should be noted that in the actual implementation of the converter 220, two or more of these functions may be combined in a single circuit.

The converter 220 works as follows. The first stage (e.g., stage $222_0$) samples and holds the analog input INPUT (using SHA 230), produces a k-bit digital estimate of the held input (using ADC 232), converts the digital estimate to analog (using DAC 234), subtracts the result from the held input (using subtractor 236), and in the illustrated implementation amplifies the residue by e.g., a power of 2 (using the amplifier 238). The following stage in the pipeline samples the amplified residue and performs the same sequence of operations while the first stage begins processing the next input sample. Since each stage incorporates a sample-and-hold function, the analog data is preserved, allowing different stages to process different samples concurrently. Thus, the conversion rate of the converter 220 depends on the speed of only one stage, usually the front end stage (e.g., stage $222_0$).

Figure 8:
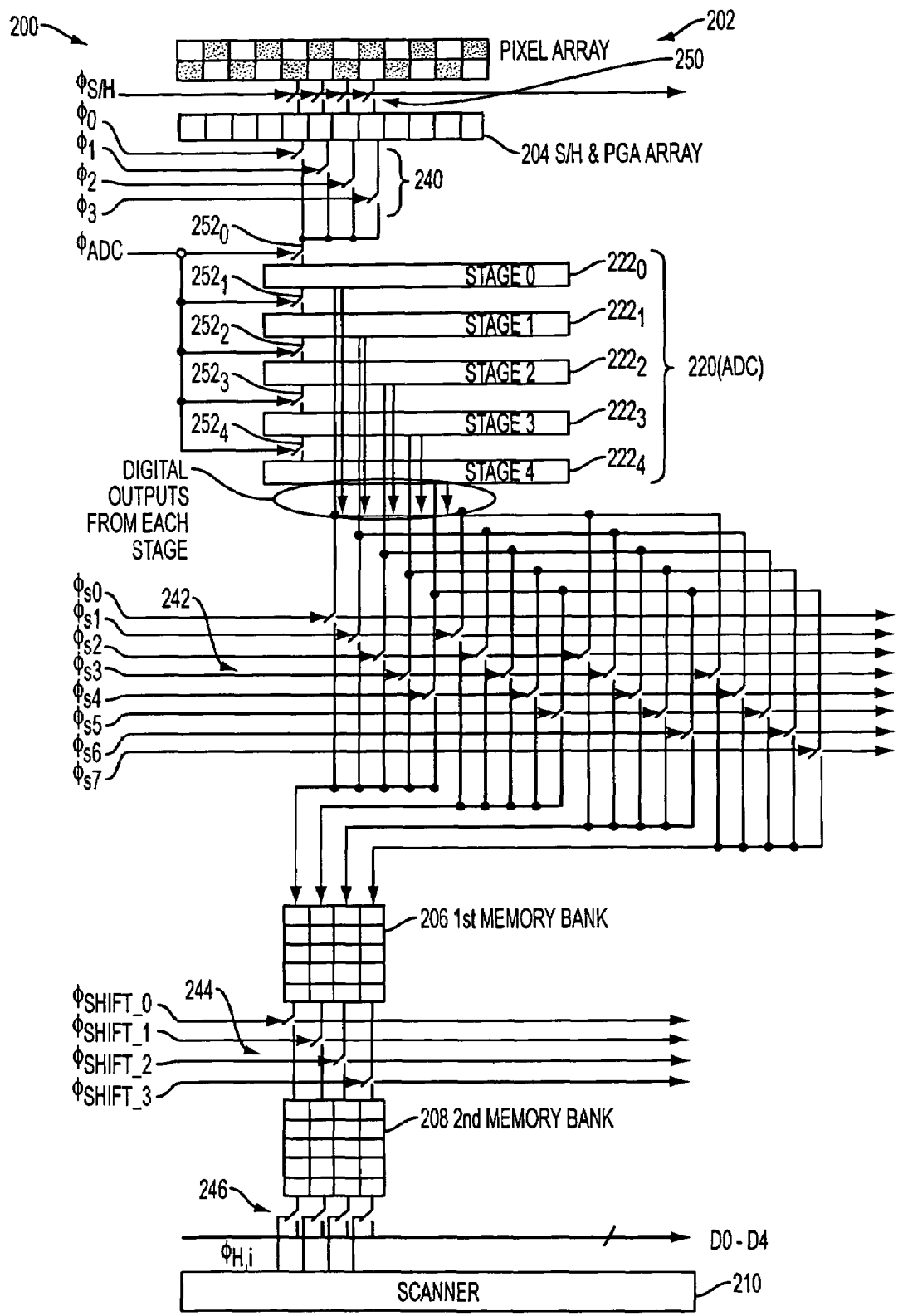
FIG. 8 illustrates a more detailed view of the imaging device of FIG. 6.

FIG. 8 illustrates a more detailed view of the imaging device 200 of FIG. 6. As with the prior examples, the illustrated device 200 uses a 5-bit pipeline analog-to-digital converter 220 that is shared by four columns. The analog-to-digital converter 220 comprises five stages $220_0$, $220_1$, $220_2$, $220_3$, $220_4$. In the illustrated embodiment, one bit is processed by one ADC stage $220_0$, $220_1$, $220_2$, $220_3$, $220_4$ (that is, k=1 in FIG. 7).

The FIG. 8 embodiment shows that sample and hold switches 250, controlled by a sample and hold control signal φS/H, are provided between the pixel array 202 and the S/H & PGA array circuitry 204. The first switches 240 are controlled by a plurality of first control signals φ0, φ1, φ2, φ3. An analog-to-digital conversion control signal φADC is used to close a plurality of ADC switches $252_0$, $252_1$, $252_2$, $252_3$, $252_4$ connected between the first switches 240 and a respective stage of the ADC 220. The second switches 242 are controlled by a plurality of second control signals φs0, φs1, φs2, φs3, φs4, φs5, φs6, φs7. The first control signals φ0, φ1, φ2, φ3, analog-to-digital conversion control signal φADC and the plurality of second control signals φs0, φs1, φs2, φs3, φs4, φs5, φs6, φs7 are generated by a controller such as the row operations and ADC controller 58 (illustrated in FIG. 2).

The third switches 244 are controlled by a plurality of third control signals φshift_0, φshift_1, φshift_2, φshift_3. The plurality of third control signals φshift_0, φshift_1, φshift_2, φshift_3 may be generated by a controller such as the SRAM/ read controller 66 (illustrated in FIG. 2). The fourth switches 246 are controlled by a plurality of fourth control signals φH,I generated by the scanner 210.

During operation, when the first control signal φ0 and the analog-to-digital conversion control signal φADC are held high, stage 0 $222_0$ of the analog-to-digital converter 222 receives an analog signal from the i-th sample and hold circuit 204. When the second control signal φs0 is high, the digital output from stage 0 is fed to the first memory bank 206 through switches 242. When first control signal φ1 and the analog-to-digital conversion control signal φADC are held high, stage 0 of the analog-to-digital converter 222 receives an analog signal from the (i+1)-th sample and hold circuit 204. This operation repeats until the digital output from the last stage of the ADC 220 is completed.

Figure 9:
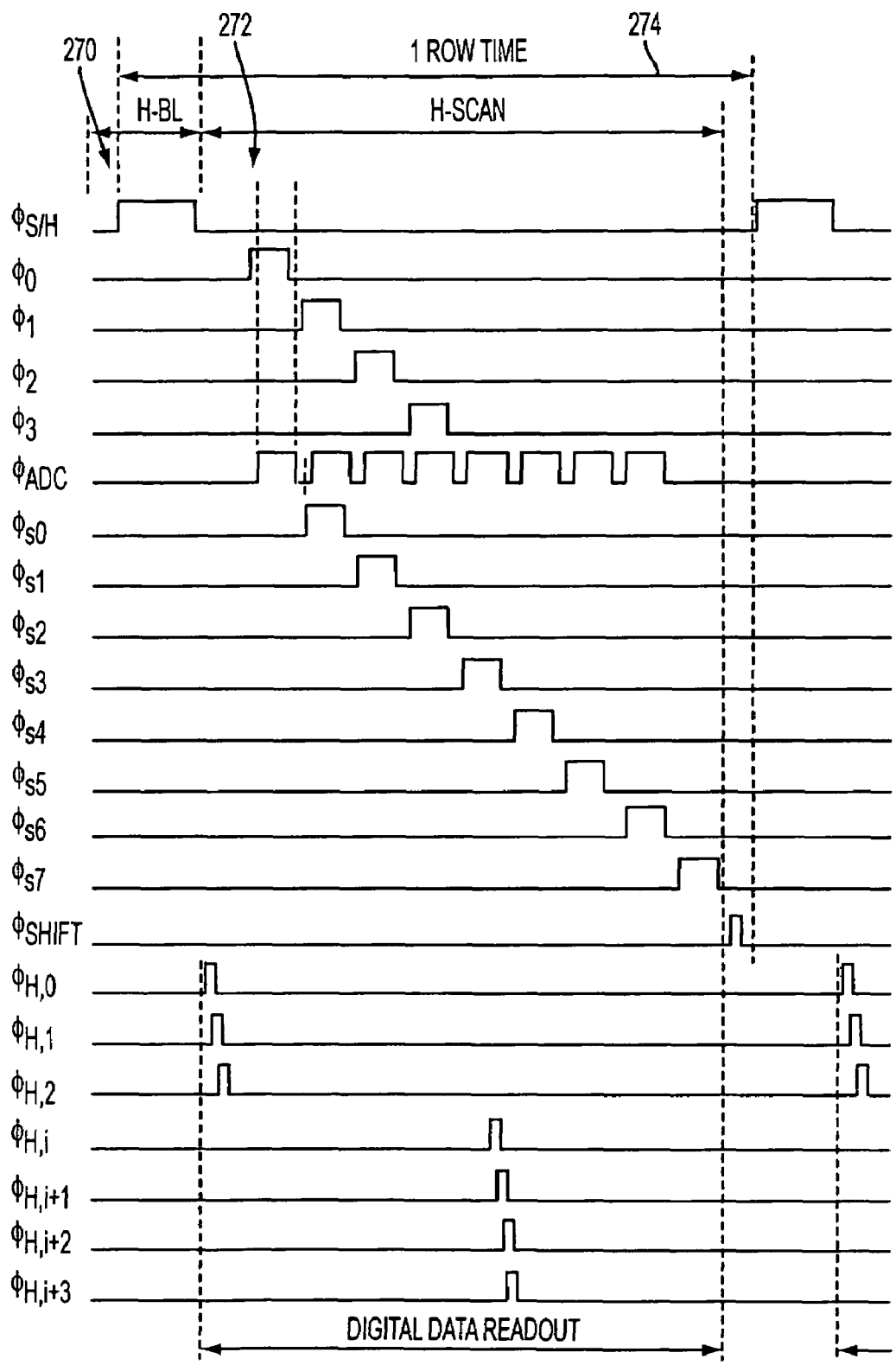
FIG. 9 is an exemplary timing diagram of the operation of the FIG. 8 imaging device in accordance with the first operating method illustrated in FIG. 4.

FIG. 9 is an exemplary timing diagram of the operation of the FIG. 8 imaging device 200 in accordance with the first operating method illustrated in FIG. 4. In the illustration, the plurality of third control signals φshift_0, φshift_1, φshift_2 φshift_3 are identical (meaning that data is shifted from the first memory bank 206 to the second memory bank 208 at the same time). As such, FIG. 9 illustrates only one third control signal using the label "φshift."

Three time periods 270, 272 and 274 are shown. The first time period 270 corresponds to the H-BL, the second time period 272 corresponds to the H-scan period and the third time period 274 corresponds to the row time. During the first time period 270, the data from the current row ROW_i is sampled and held (φS/H is activated). During the second time period 272, ROW_i−1 data is readout from the second memory bank 208 (φH,0, . . . , φH,i+3 are sequentially activated) while the ROW_i signals are input into the analog-to-digital converters (φ0, . . . , φ3 and φADC are activated), converted into digital data that is output into the first memory bank 206 (φs0, . . . , (φs7) are activated. The row time period 274 concludes when the ROW_i data stored in the first memory bank 206 is shifted into the second memory bank (φshift is generated).

Figure 10:
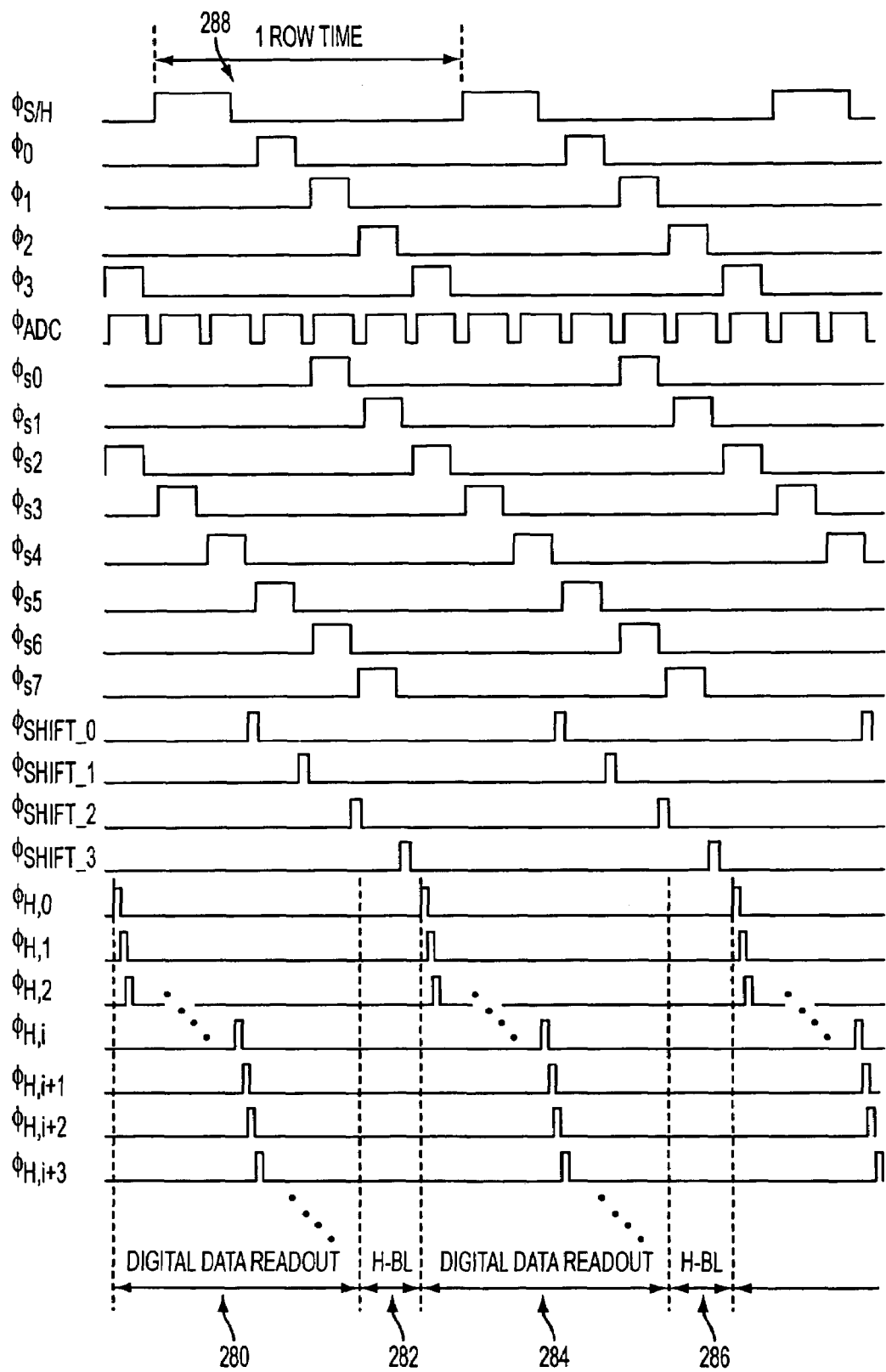
FIG. 10 is an exemplary timing diagram of the operation of the FIG. 8 imaging device in accordance with the second operating method illustrated in FIG. 5.

It should be notes that the H-SCAN period 272 should be determined by the total analog-to-digital conversion period. Thus, the data readout frequency and/or data readout configuration should be properly chosen so that the data readout period becomes shorter than the analog-to-digital conversion period FIG. 10 is an exemplary timing diagram of the operation of the FIG. 8 imaging device 200 in accordance with the second operating method illustrated in FIG. 5. In the illustration, the plurality of third control signals φshift_0, φshift_1, φshift_2, φshift_3 are not identical (meaning that the data shifted from the first memory bank 206 to the second memory bank 208 is not shifted out at the same time). As such, the plurality of third control signals φshift_0, φshift_1, φshift_2, φshift_3 are shown individually.

FIG. 10 illustrates five time periods 280, 282, 284, 286, 288. In the first time period 280, stored digital data from a previously read and converted row ROW_i−2 is readout out of the device 200 (φH,0, . . . , φH,i+3 are activated in sequence). During this same time period 280, a new row ROW_i is sampled and held (φS/H is activated). Analog-to-digital conversions of ROW_i−1 signals also occur (φ3, φADC are activated) and are sequentially stored in the first memory bank 206 (φs2, . . . , φ7 are activated). Some stored data from the first memory bank 206 is shifted into the second memory bank 208 (φshift_0, . . . , φshift_2 are activated). Some of the ROW_i data may also be converted during this time (φ0, . . . , φ2, φADC are activated).

The second illustrated period 282 corresponds to the H-BL. During this period, analog-to-digital conversion, storage of converted data and shifting of previously stored digital data continues. The third and fourth time periods 284, 286 are similar to the first and second time periods 280, 282 (except for the row being output and the row being sampled and converted). The last time period 288 corresponds to the row time associated with the second operating method of the invention (described above in more detail with respect to FIG. 5).

It should be appreciated that the invention has been described with reference to an imaging device having $N_{col}$=4 and $N_{bit}$=5. This was done for simplicity purposes only. Instead, it should be appreciated that the invention can be used to form an imaging device having more shared columns (i.e., larger $N_{col}$) and higher resolution (i.e., larger $N_{bit}$). In one desired embodiment, the device 200 has 12 shared columns per ADC (i.e., $N_{col}$=12) and a 14-bit resolution (i.e., $N_{bit}$=14).

With this semi-parallel column pipeline analog-to-digital scheme of the invention, equation (5), the ratio of the required frequency bandwidth, becomes:

$$\frac{(\Delta f)_{S-CP}}{(\Delta f)_S} = \frac{N_{col}}{N_H}. \tag{18}$$

Equation (8) is rewritten as:

$$\frac{P_{S-CP}}{P_S} = N_H \cdot \left(\frac{C_{S-CP}}{C_S}\right)^2 \cdot \left(\frac{\Delta f_{S-CP}}{\Delta f_S}\right)^2 = \frac{(N_{col})^2}{N_H} \cdot \left(\frac{C_{S-CP}}{C_S}\right)^2. \quad (19)$$

For example, with $N_H$=2052 and $N_{col}$=12 (i.e., the number of analog-to-digital converters is 171), the ratio of the power consumption between the semi-column-parallel scheme and the serial scheme becomes less than 0.07 (since it is likely that $C_{S-CP} < C_S$).

The proposed semi-column-parallel ADC scheme is suitable for digital-output CMOS image sensors, in which either high pixel count, a small pixel size, high frame rate, or any combinations of these, are required.

Figure 11:
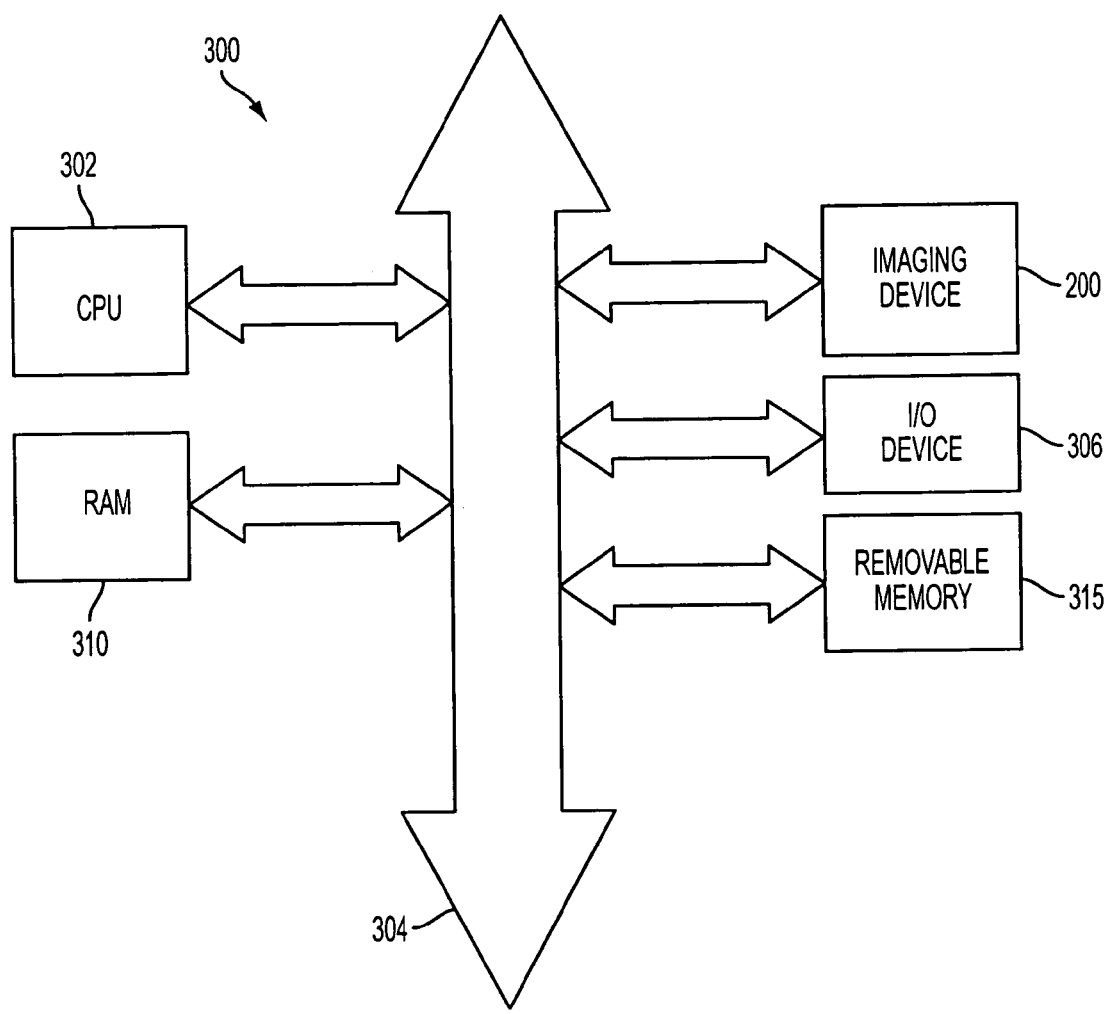
FIG. 11 shows a processor system incorporating at least one imager constructed in accordance with an embodiment of the invention.

FIG. 11 shows a system 300, a typical processor system modified to include an imaging device 200 (such as the imaging device 200 illustrated in FIGS. 6 and 8) of the invention. The processor system 300 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 300, for example a camera system, generally comprises a central processing unit (CPU) 302, such as a microprocessor, that communicates with an input/output (I/O) device 306 over a bus 304. Imaging device 200 also communicates with the CPU 302 over the bus 304. The processor-based system 300 also includes random access memory (RAM) 310, and can include removable memory 315, such as flash memory, which also communicate with the CPU 302 over the bus 304. The imaging device 200 may be combined with a processor, such as a CPU, digital signal processor, or microprocessor, with or without memory storage on a single integrated circuit or on a different chip than the processor.

The present invention has been described as being used in a CMOS imaging device. It should be appreciated, however, that the semi-column-parallel architecture and method of operation could also be applied to other imaging devices such as CCD imaging devices.

It should be appreciated that other embodiments of the invention include a method of manufacturing the device 200 of the invention as illustrated in FIGS. 6 and 8. For example, in one exemplary embodiment a method of constructing an imaging device includes the steps of forming an array of pixels organized into a plurality of rows and columns; forming a plurality of sample and hold circuits, each circuit being electrically connected to a respective column of said array, each circuit sampling and holding analog signals from the respective column; and forming a plurality of pipeline analog-to-digital converters, each pipeline analog-to-digital converter being electrically connected to a respective number of sample and hold circuits, each analog-to-digital converter converting the held analog signals from the respective number of sample and hold circuits into digital data.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. An imaging device comprising:
    an array of pixels organized into a plurality of rows and columns;
    a plurality of sample and hold circuits, each circuit being electrically connected to a respective column of said array, each circuit sampling and holding analog signals from the respective column; and
    a plurality of pipeline analog-to-digital converters, each pipeline analog-to-digital converter being electrically connected to a respective plurality of columns via a respective number of sample and hold circuits, each analog-to-digital converter converting the held analog signals from the respective number of sample and hold circuits into digital data,
    wherein each pipeline analog-to-digital converter comprises a number of pipeline stages and the number of pipeline stages is equal to the number of columns said analog-to-digital converter is connected to.

2. The device of claim 1, wherein each pipeline stage comprises:
    a pipeline stage sample and hold circuit connected to input, sample and hold the analog signals;
    a k-bit analog-to-digital converter circuit connected to receive the analog signals from the pipeline stage sample and hold circuit, said k-bit analog-to-digital converter circuit creating k-bit digital data from the analog signals;
    a k-bit digital-to-analog converter circuit connected to receive the k-bit digital data from the k-bit analog-to-digital converter circuit, said k-bit digital-to-analog converter circuit creating analog signals from the k-bit digital data;
    a subtractor connected to receive the analog signals from the k-bit digital-to-analog converter circuit and the analog signals from the pipeline stage sample and hold circuit, said subtractor generating a difference output; and
    an amplifier for amplifying the difference output.

3. The device of claim 2, wherein k-bit is a digital resolution of the plurality of analog-to-digital converters.

4. An imaging device comprising:
    an array of pixels organized into a plurality of rows and columns;
    a plurality of sample and hold circuits, each circuit being electrically connected to a respective column of said array, each circuit sampling and holding analog signals from the respective column;
    a plurality of pipeline analog-to-digital converters, each pipeline analog-to-digital converter being electrically connected to a respective number of sample and hold circuits, each analog-to-digital converter converting the held analog signals from the respective number of sample and hold circuits into digital data;
    a first memory bank connected to said analog-to-digital converters, said first memory bank storing digital data from all of the analog-to-digital converters;
    a second memory bank connected to said first memory bank, said second memory bank inputting and storing the stored digital data from the first memory bank; and
    a column scanner connected to said memory bank, said column scanner controlling the second memory bank to output the digital data stored in said second memory bank.

5. An imaging device comprising:
an array of pixels organized into a plurality of rows and columns;
a plurality of sample and hold circuits, each circuit being electrically connected to a respective column of said array, each circuit sampling and holding analog signals from the respective column; and
a plurality of pipeline analog-to-digital converters, each pipeline analog-to-digital converter being electrically connected to a respective plurality of columns via respective sample and hold circuits in a semi-column-parallel manner, each analog-to-digital converter converting the held analog signals from the respective number of sample and hold circuits into digital data,
wherein each pipeline analog-to-digital converter comprises a number of pipeline stages and the number of pipeline stages is equal to a number of columns said analog-to-digital converter is connected to.

6. An imaging device comprising:
an array of pixels organized into a plurality of rows and columns;
a plurality of sample and hold circuits, each circuit being electrically connected to a respective column of said array, each circuit sampling and holding analog signals from the respective column; and
a plurality of pipeline analog-to-digital converters, each pipeline analog-to-digital converter being electrically connected to the sample and hold circuits in a semi-column-parallel manner, each analog-to-digital converter converting the held analog signals from the respective number of sample and hold circuits into digital data;
a first memory bank connected to said analog-to-digital converters, said first memory bank storing digital data from all of the analog-to-digital converters;
a second memory bank connected to said first memory bank, said second memory bank inputting and storing the stored digital data from the first memory bank; and
a column scanner connected to said memory bank, said column scanner controlling the second memory bank to output the digital data stored in said second memory bank.

7. The device of claim 6, further comprising:
a first set of switches connected between said sample and hold circuits and said analog-to-digital converters;
a second set of switches connected between said analog-to-digital converters and said first memory bank;
a third set of switches between said first and second memory banks; and
a fourth set of switches between said second memory bank and said scanner.

8. A processor system comprising:
a processor; and
an imaging device connected to said processor, said imaging device comprising:
an array of pixels organized into a plurality of rows and columns;
a plurality of sample and hold circuits, each circuit being electrically connected to a respective column of said array, each circuit sampling and holding analog signals from the respective column; and
a plurality of pipeline analog-to-digital converters, each pipeline analog-to-digital converter being electrically connected to a respective plurality of columns via a respective number of sample and hold circuits, each analog-to-digital converter converting the held analog signals from the respective number of sample and hold circuits into digital data,
wherein each pipeline analog-to-digital converter comprises a number of pipeline stages and the number of pipeline stages is equal to a number of columns said analog-to-digital converter is connected to.

9. The system of claim 8, wherein each pipeline analog-to-digital converter is connected to twelve sample and hold circuits.

10. The system of claim 8, wherein each pipeline stage comprises:
a pipeline stage sample and hold circuit connected to input, sample and hold the analog signals;
a k-bit analog-to-digital converter circuit connected to receive the analog signals from the pipeline stage sample and hold circuit, said k-bit analog-to-digital converter circuit creating k-bit digital data from the analog signals;
a k-bit digital-to-analog converter circuit connected to receive the k-bit digital data from the k-bit analog-to-digital converter circuit, said k-bit digital-to-analog converter circuit creating analog signals from the k-bit digital data;
a subtractor connected to receive the analog signals from the k-bit digital-to-analog converter circuit and the analog signals from the pipeline stage sample and hold circuit, said subtractor generating a difference output; and
an amplifier for amplifying the difference output.

11. The system of claim 10, wherein k-bit is the digital resolution of the plurality of analog-to-digital converters.

12. A processor system comprising:
a processor; and
an imaging device connected to said processor, said imaging device comprising:
an array of pixels organized into a plurality of rows and columns;
a plurality of sample and hold circuits, each circuit being electrically connected to a respective column of said array, each circuit sampling and holding analog signals from the respective column; and
a plurality of pipeline analog-to-digital converters, each pipeline analog-to-digital converter being electrically connected to a respective plurality of columns via respective sample and hold circuits in a semi-column-parallel manner, each analog-to-digital converter converting the held analog signals from the respective number of sample and hold circuits into digital data,
wherein each pipeline analog-to-digital converter is connected to more than one sample and hold circuit, each pipeline analog-to-digital converter comprises a number of pipeline stages and the number of pipeline stages is equal to a number of sample and hold circuits said analog-to-digital converter is connected to.

13. The system of claim 12, wherein each pipeline stage comprises:
a pipeline stage sample and hold circuit connected to input, sample and hold the analog signals;
a k-bit analog-to-digital converter circuit connected to receive the analog signals from the pipeline stage sample and hold circuit, said k-bit analog-to-digital converter circuit creating k-bit digital data from the analog signals;
a k-bit digital-to-analog converter circuit connected to receive the k-bit digital data from the k-bit analog-to-digital converter circuit, said k-bit digital-to-analog converter circuit creating analog signals from the k-bit digital data;

a subtractor connected to receive the analog signals from the k-bit digital-to-analog converter circuit and the analog signals from the pipeline stage sample and hold circuit, said subtractor generating a difference output; and an amplifier for amplifying the difference output.

14. A processor system comprising:

a processor; and an imaging device connected to said processor, said imaging device comprising:

an array of pixels organized into a plurality of rows and columns;

a plurality of sample and hold circuits, each circuit being electrically connected to a respective column of said array, each circuit sampling and holding analog signals from the respective column;

a plurality of pipeline analog-to-digital converters, each pipeline analog-to-digital converter being electrically connected to the sample and hold circuits in a semi-column-parallel manner, each analog-to-digital converter converting the held analog signals from the respective number of sample and hold circuits into digital data;

a first memory bank connected to said analog-to-digital converters, said first memory bank storing digital data from all of the analog-to-digital converters;

a second memory bank connected to said first memory bank, said second memory bank inputting and storing the stored digital data from the first memory bank;

a column scanner connected to said memory bank, said column scanner controlling the second memory bank to output the digital data stored in said second memory bank;

a first set of switches connected between said sample and hold circuits and said analog-to-digital converters;

a second set of switches connected between said analog-to-digital converters and said first memory bank;

a third set of switches between said first and second memory banks;

a fourth set of switches between said second memory bank and said scanner; and at least one controller, said controller controlling the operations of said first, second, third and fourth switches such that sample and hold operations do not occur when analog-to-digital conversions and data readout operations occur.

15. A processor system comprising:

a processor; and an imaging device connected to said processor, said imaging device comprising:

an array of pixels organized into a plurality of rows and columns;

a plurality of sample and hold circuits, each circuit being electrically connected to a respective column of said array, each circuit sampling and holding analog signals from the respective column;

a plurality of pipeline analog-to-digital converters, each pipeline analog-to-digital converter being electrically connected to the sample and hold circuits in a semi-column-parallel manner, each analog-to-digital converter converting the held analog signals from the respective number of sample and hold circuits into digital data;

a first memory bank connected to said analog-to-digital converters, said first memory bank storing digital data from all of the analog-to-digital converters;

a second memory bank connected to said first memory bank, said second memory bank inputting and storing the stored digital data from the first memory bank;

a column scanner connected to said memory bank, said column scanner controlling the second memory bank to output the digital data stored in said second memory bank;

a first set of switches connected between said sample and hold circuits and said analog-to-digital converters;

a second set of switches connected between said analog-to-digital converters and said first memory bank;

a third set of switches between said first and second memory banks;

a fourth set of switches between said second memory bank and said scanner; and at least one controller, said controller controlling the operations of said first, second, third and fourth switches such that sample and hold operations, analog-to-digital conversions and data readout operations occur during a same time period.

* * * * *

UNITED STATES PATENT AND TRADEMARK OFFICE
CERTIFICATE OF CORRECTION

PATENT NO. : 7,570,293 B2  Page 1 of 1
APPLICATION NO. : 10/957724
DATED : August 4, 2009
INVENTOR(S) : Junichi Nakamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1338 days.

Signed and Sealed this

Seventh Day of September, 2010

David J. Kappos
*Director of the United States Patent and Trademark Office*